United States Patent
Chavie et al.

(10) Patent No.: US 9,754,298 B2
(45) Date of Patent: Sep. 5, 2017

(54) TECHNIQUES FOR COLLABORATIVE SHOPPING

(75) Inventors: Richard Chavie, Gainesville, GA (US);
Daniel Frederick White, Gainesville, GA (US); Mark Grossi, Muirhead (GB); Michael Robertson McNamara, Dundee (GB)

(73) Assignee: NCR CORPORATION, Duluth, GA (US)

(*) Notice: Subject to any disclaimer, the term of this patent is extended or adjusted under 35 U.S.C. 154(b) by 72 days.

(21) Appl. No.: 13/222,127

(22) Filed: Aug. 31, 2011

(65) Prior Publication Data

US 2013/0054328 A1 Feb. 28, 2013

(51) Int. Cl.
G06Q 30/00 (2012.01)
G06Q 99/00 (2006.01)
G06Q 30/06 (2012.01)
G06Q 50/00 (2012.01)

(52) U.S. Cl.
CPC ............ G06Q 30/06 (2013.01); G06Q 50/01 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,882,043 B2* | 2/2011 | Bantz | ............... | G06Q 30/016 705/346 |
| 7,970,661 B1* | 6/2011 | Abraham | ............... | G06Q 10/10 705/14.23 |
| 8,739,044 B1* | 5/2014 | Varadarajan | ............ | G06F 3/0481 709/204 |
| 2002/0055973 A1* | 5/2002 | Low | ............... | G06Q 30/06 709/204 |
| 2002/0065722 A1* | 5/2002 | Hubbard | ............... | G06Q 30/02 705/14.73 |
| 2005/0177446 A1* | 8/2005 | Hoblit | ............... | G06Q 10/10 705/26.1 |
| 2006/0122895 A1* | 6/2006 | Abraham | ............... | G06Q 30/02 705/26.2 |
| 2006/0155608 A1* | 7/2006 | Bantz | ............... | G06Q 30/016 705/26.43 |
| 2006/0161484 A1* | 7/2006 | Pandhe | ............... | G06Q 30/06 705/26.81 |
| 2008/0177641 A1* | 7/2008 | Herniak | ............... | G06Q 30/02 705/26.81 |
| 2009/0287728 A1* | 11/2009 | Martine | ............... | G06Q 30/02 |
| 2010/0030578 A1* | 2/2010 | Siddique | ............ | G06Q 10/0637 705/3 |
| 2010/0049581 A1* | 2/2010 | Bantz | ............... | G06Q 30/016 705/304 |
| 2010/0269054 A1* | 10/2010 | Goldberg | ............ | G06Q 30/0601 715/757 |

(Continued)

*Primary Examiner* — Matthew T Sittner
(74) *Attorney, Agent, or Firm* — Schwegman Lundberg & Woessner, PA

(57) ABSTRACT

Techniques for collaborative shopping are presented. During a shopping transaction, a customer collaborates in real time with one or more additional participants. Real-time and dynamic feedback is provided to the customer from the participants throughout the shopping transaction. Furthermore, real-time and dynamic feedback is provided from the customer to the participants throughout the shopping transaction.

15 Claims, 3 Drawing Sheets

(56) References Cited

U.S. PATENT DOCUMENTS

| | | | |
|---|---|---|---|
| 2010/0299616 A1* | 11/2010 | Chen | G06Q 10/10 715/753 |
| 2011/0016023 A1* | 1/2011 | Zakas | G06Q 30/0603 705/27.1 |
| 2011/0178889 A1* | 7/2011 | Abraham | G06Q 10/10 705/26.1 |
| 2012/0290478 A1* | 11/2012 | Crofts | G06Q 20/322 705/44 |
| 2013/0054328 A1* | 2/2013 | Chavie | G06Q 50/01 705/14.23 |
| 2013/0211953 A1* | 8/2013 | Abraham | G06Q 30/06 705/26.8 |
| 2013/0215116 A1* | 8/2013 | Siddique | G06Q 30/0643 345/420 |

* cited by examiner

TECHNIQUES FOR COLLABORATIVE SHOPPING

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention. Individuals also perform transactions online and are capable of using their smart phones to check out of stores.

In addition, technology has allowed individuals to engage in a variety of social-networking activities. These activities support collaborative actions amongst the users of social-networking sites. For example, social-networking users organize flash dance mobs for purposes of having members show up at a physical location and perform a dance at a designated date and time. More recently, social-networking sites have been used for more nefarious purposes, such as organizing a mob to rob or loot a particular store at a particular date and time.

Most smart phones support instant access to social-networking sites, such that individuals can provide up to the minute details about themselves or others that they are observing and collaborate in real time with one another.

Yet, one area where collaboration has not yet advanced is in the area of shopping transactions. Typical, online transactions are aligned to a specific individual based on an identifier for that individual. A single user has a single shopping cart associated with that user for an online transaction. So, the traditional online shopping experience prevents people in a same household or in other mutual beneficial relationships from collaboratively shopping with one another. The same drawback with online shopping exists during a physical shopping experience; for example, a physical transaction is not tied to other online activities; the physical transaction is an independent isolated event with a customer.

SUMMARY

In various embodiments, techniques for collaborative shopping are presented. According to an embodiment, a method for collaborating during a shopping transaction is discussed.

Specifically, a user is registered for collaborative shopping and shopping preferences are obtained from the user. Then, a shopping transaction is created, as directed by the user and using the shopping preferences. Second users are assigned to the shopping transaction, as permitted by the user and one or more communication sessions are created between the user and the second users during the shopping transaction for sharing information related to the shopping transaction.

DETAILED DESCRIPTION

The aforementioned industry problems are resolved by allowing multiple participants to collaborate on preparing shopping lists, accepting promotions, receiving shared alerts, sharing information via multiple media sources including photos and videos, and following the shopping process through to checkout and/or subsequent returns.

The techniques herein permit multiple individuals to contribute to and see the same information, including merging user initiated photos, as the shopping process progresses; the techniques also include the opportunity to collaborate in real-time when an individual is in the store and another is on the Internet or some other shared communication vehicle and for both to see the physical and virtual alternatives to an item that is being considered for purchase.

For example, consider one person trying on different clothes in a store while another sees the choices being made on a web site and is able to suggest alternative items and/or styles from the web site or physical store and to see that representation appear on the shopping portal as well as in a simulated form (such as via an avatar).

In an embodiment, a recommendation engine is loaded with the consumer's initial preferences. The recommendation engine, during operation, matches the goods available to those preferences and thru a set of learning algorithms constantly tailors and updates the recommendations based on a dynamic consumer profile.

So, whenever multiple people need to collaborate, the shopping experience benefits from the collaborative shopping techniques presented herein. A home improvement project is another example to consider. Suppose, a wife goes into the design store and sits down with a sales associate to plan a new kitchen. After going over the basics, she places a video conference call to her best friend who is at home. She has always loved the kitchen island in her friend's kitchen, so her friend is able to show the associate the island to design it into the new kitchen. She then calls another friend to show the double oven and stove top she has, and the list might go on. Finally, as they begin to finalize the plans, she gets her husband on the phone for his input.

Planning a wedding or some other special event is another example where the power of allowing multiple participants to collaborate during the shopping experience is beneficial. In all of these examples, having real time access via mobile or other Internet-capable devices can enhance and expand the overall shopping experience.

As will be demonstrated herein, the techniques that follow enable individuals to shop while in different physical and/or virtual locations but also permit them to execute a converged shopping process with friends and family.

It is within this initial context that specific embodiments are now discussed with reference to the FIGS. 1-3.

Figure 1:
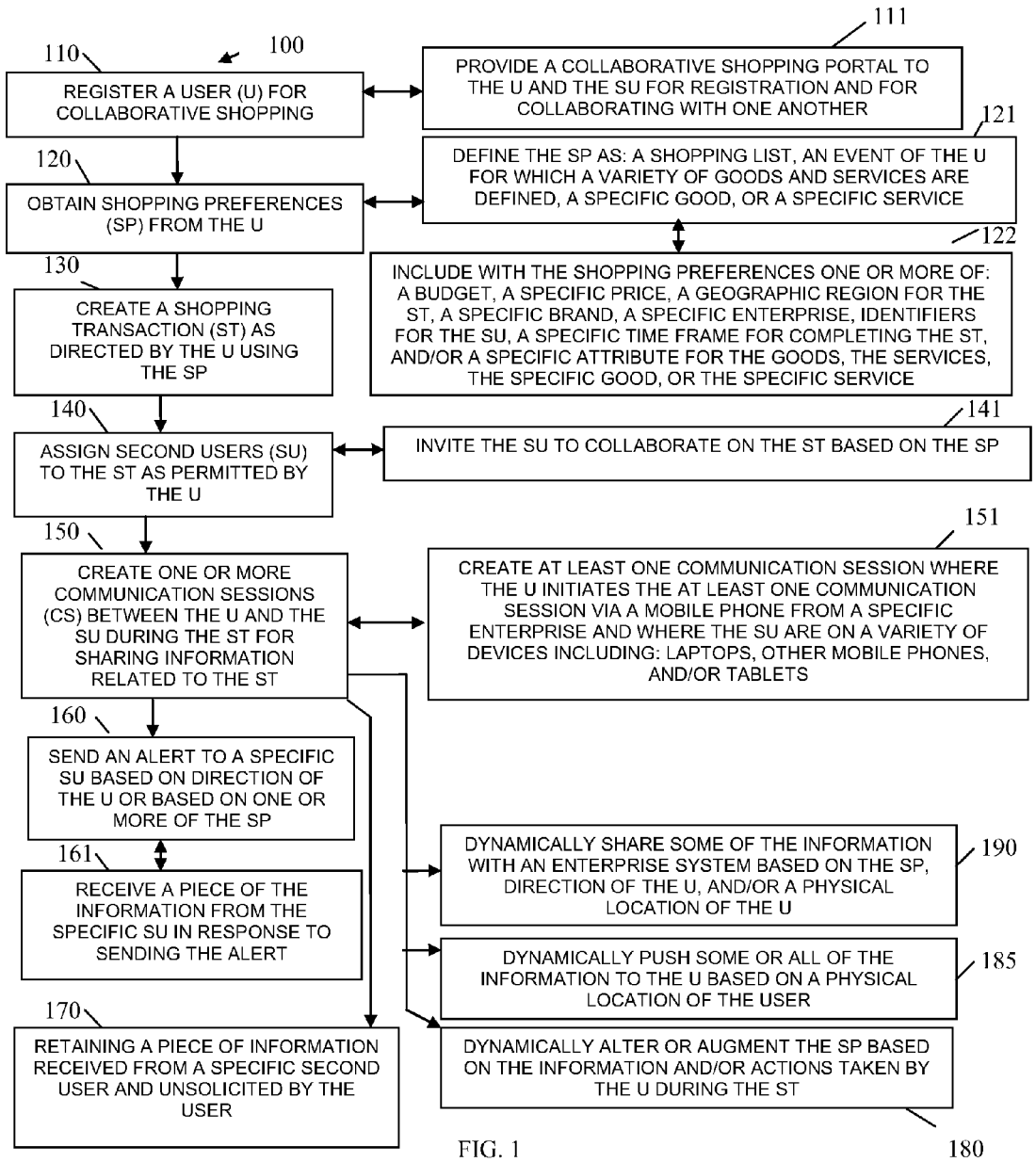
FIG. 1 is a diagram of a method for collaborating during a shopping transaction is provided, according to an example embodiment.

FIG. 1 is a diagram of a method 100 for collaborating during a shopping transaction is provided, according to an example embodiment. The method 100 (hereinafter "shopping collaboration manager") is implemented as instructions programmed and residing on a non-transitory computer-readable (processor-readable) storage medium and executed by one or more processors. The processors are specifically configured and programmed to process the shopping collaboration manager. The shopping collaboration manager operates over a network. The network is wireless or a combination of wired and wireless. In an embodiment, the network is the Internet, a cellular network, a satellite network, or the network is a combination or all of these networks.

The shopping collaboration manager operates on an external server that is different from a portable device of a consumer (e.g., smart phone, touch pad, laptop, and the like).

At 110, the shopping collaboration manager registers a user for collaborative shopping. This can be done by establishing an account for the user and collecting some information as to how to contact the user via automated mechanisms, such as via an email address, a mobile phone number, an instant message account, and the like. In an embodiment, registration can be completed automatically on behalf of the user when the user provides a loyalty account number with an enterprise affiliated with shopping collaboration manager.

According to an embodiment, at 111, the shopping collaboration manager provides a collaborative shopping portal to the user and second users (discussed below with reference to the processing at 140) for collaborating with one another. So, in this embodiment, the shopping collaboration manager is a service associated with a shopping social networking site that provides customer-facing web pages for the user to interact with.

At 120, the shopping collaboration manager obtains shopping preferences from the user. These shopping preferences can be made via selections from lists presented to the user, via free text entry by the user, via searching of repositories presented to the user, and/or via questions asked in automated fashion to the user.

According to an embodiment, at 121, the shopping collaboration manager defines (at the direction of the user) the shopping preferences as: a shopping list, an event of the user for which a variety of goods and services are defined (such as a wedding, a graduation, an anniversary, and the like), a specific good, and/or a specific service.

Continuing with the embodiment of 121 and at 122, the shopping collaboration manager includes (again via direction of the user) with the shopping preferences a variety of details, such as a budget, a specific price, a geographic region for the shopping transaction, a specific brand for a good or service, a specific enterprise providing the good or service, identifiers for the second users, and/or a specific attribute for the goods, the services, the specific good, and/or the specific service.

At 130, the shopping collaboration manager creates a shopping transaction as directed by the user and by using the shopping preferences. This may be viewed as creation of a project for the shopping collaboration manager where workflow and collaboration is managed and controlled by the shopping collaboration manager with cooperation of the user.

In an embodiment, the shopping transaction is a series of sub transactions that are conducted by the user and perhaps the second users over a period of time (such as a wedding). The period of time may be bounded, if declared in the shopping preferences. In other cases, the sub transactions can occur until a specific event (specific decision or purchase is made).

In another situation, the shopping transaction is defined as decisions and the input that leads to a single purchasing activity (such as redesigning a kitchen in the example presented above).

At 140, the shopping collaboration manager assigns second users to the shopping transaction as permitted by the user. This can occur in a variety of manners and can be defined, in some cases, via the shopping preferences.

For example, at 141, the shopping collaboration manager can send automated invitations on behalf of the user to each of the second users based on the shopping preferences.

Other situations can occur as well; for example, the shopping collaboration manager may infer or derive some of the second users based on the shopping transaction and permissions defined in the shopping preferences. So, specific enterprises that can assist in offering goods and services for the shopping transaction can be identified by the shopping collaboration manager in an automated fashion and if permitted by the shopping preferences automatically added as second users to the shopping transaction.

At 150, the shopping collaboration manager creates one or more communication sessions between the user and the second users during the shopping transaction for sharing information related to the shopping transaction. The shopping transaction can occur over a series of days, weeks, months, etc. Each communication session can include peer-to-peer (P2P) between the user and one of the second users or can occur via a multicast between a subset or all of the second users and the user. Moreover, in some cases, the sharing of information is directly communicated to the user from a second user or the information passes through the shopping collaboration manager.

In an embodiment, at 151, the shopping collaboration manager creates at least one communication session where the user initiates the at least one communication session via a mobile phone from a specific enterprise and where the second users are on a variety of devices including laptops, other mobile phones, tablets, and others.

According to an embodiment, at 160, the shopping collaboration manager sends an alert to a specific second user based on direction of the user or based on one or more of the second principals. Here, the user may be considering an item in a store and may specifically request that a specific second user be consulted. Alternatively, policies in the shopping preference may dictate an alert go to a specific second principal when an event is raised (such as a specific item was purchased, the user is in a specific store, and others).

Continuing with the embodiment of 160 and at 161, the shopping collaboration manager receives a piece of the information from the specific second user in response to sending the alert. So, for example, suppose the alert indicates an opinion or counter offer is to be sent by the second user.

In another situation, at 170, the shopping collaboration manager retains a piece of information received from a specific second user and unsolicited by the user. That is, the second users are free to add and annotate the information for the shopping transaction without being asked by the user and when the second user desires to add information.

In still another case, at 180, the shopping collaboration manager dynamically alters or augments the shopping preferences based on the information and/or actions taken by the user during the shopping transaction. That is, the shopping collaboration manager tracks and monitors the shopping transaction information and actions taken with respect to the shopping transaction and learns to modify, delete, and/or add shopping preferences to the shopping transaction.

In an embodiment, at 185, the shopping collaboration manager dynamically pushes some or all of the information to the user based on a physical location of the user. So, for example, when the user is dedicated as being in a specific store or near a specific store (based on defined threshold differences for described geo-fencing of the location), an enterprise identified as one of the second users (or as permitted by the shopping preferences to dynamically join the shopping transaction as a new second user) dynamically pushes some or all of the information to the user.

In another situation, at 190, the shopping collaboration manager dynamically shares some of the information with an enterprise system based on the second preferences, the direction of the user, and/or a physical location of the user. Here, enterprises or retailers that can provide all or some of the shopping transaction can automatically receive requests for quotes when permitted via the shopping preferences.

It is noted that the processing of the shopping collaboration manager, as described above, includes details where actions are taken by the user. It is intended that these actions also occur via an automated mechanism that exists on a mobile device of the user, such as a mobile phone. This processing occurs via an agent installed or an app installed on the users mobile device and the processing associated with that agent is presented below with respect to the FIG. 2.

Figure 2:
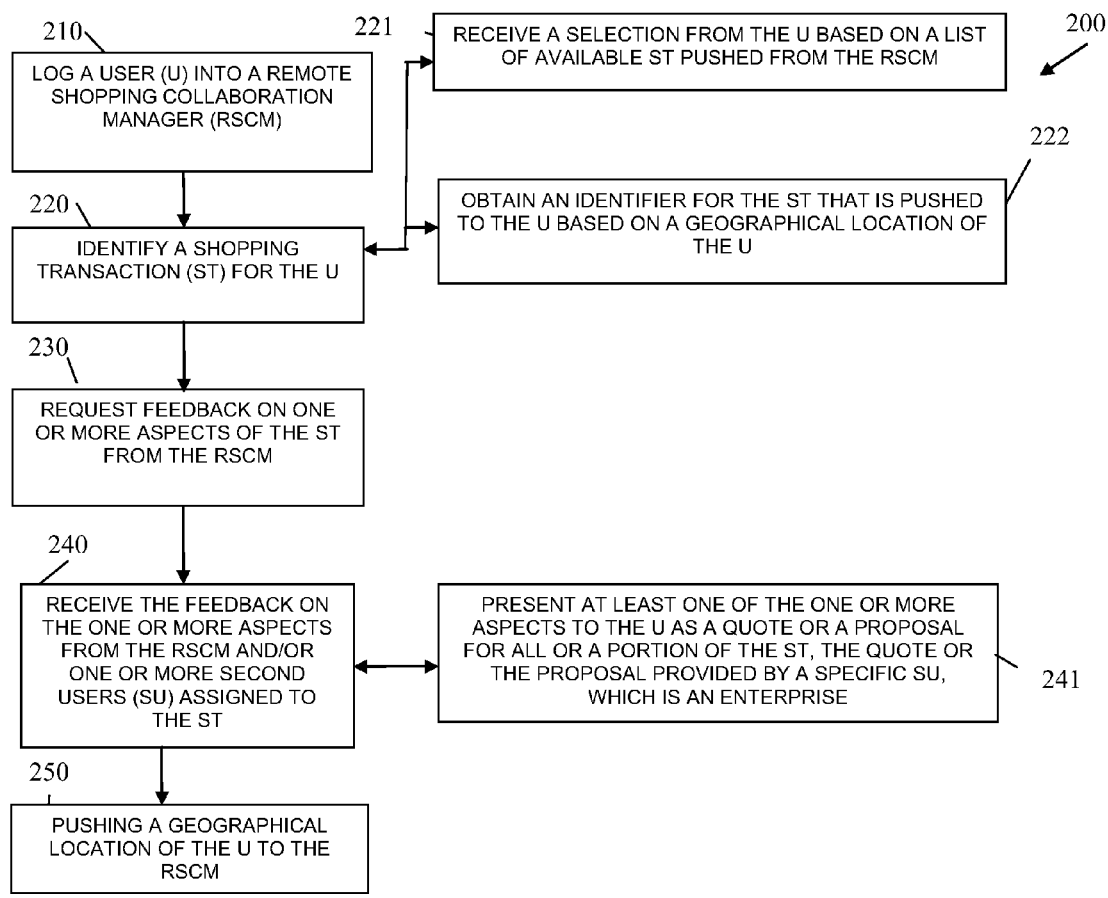
FIG. 2 is a diagram of another method for collaborating during a shopping transaction, according to an example embodiment.

FIG. 2 is a diagram of another method 200 for collaborating during a shopping transaction, according to an example embodiment. The method 200 (hereinafter "shopping collaboration agent") is implemented as instructions and programmed within a non-transitory computer-readable (processor-readable) storage medium that executes on one or more processors of a mobile device, the processors of the mobile device are specifically configured to execute the shopping collaboration agent. The shopping collaboration agent is operational over a network; the network is wireless or a combination of wired and wireless. In an embodiment, the network is the Internet, a cellular network, a satellite network, or the network is a combination or all of these networks.

In an embodiment, the shopping collaboration agent describes processing actions from the perspective of a specific customer that is interacting with shopping collaboration manager described above with reference to the FIG. 1. It is noted that for a single shopping experience or transaction there are multiple instances of the shopping collaboration agent that processes on mobile devices of each customer that is collaborating in the shopping transaction.

At 210, the shopping collaboration agent logs a user into a remote shopping collaboration manager. In an embodiment, the remote shopping collaboration manager is the method 100 discussed above with respect to the FIG. 1. The log in can be automatically achieved on behalf of the user, such as when the shopping collaboration agent detects that the user is in a certain physical location or browsing a specific web site (the events that are used to perform automatic log in of the user can be configured as a profile for the user or defined in shopping preferences for the user). In other cases, the user, via an interface to the shopping collaboration agent can directly instruct the shopping collaboration agent to log the user into the remote shopping collaboration manager.

At 220, the shopping collaboration agent identifies a shopping transaction for the user. This can also occur in a variety of user-configured manners.

For example, at 221, the shopping collaboration agent receives a selection from the user based on a list of available shopping transactions of the user. The list dynamically pushed to the shopping collaboration agent from the remote shopping collaboration manager.

In another case, at 222, the shopping collaboration agent obtains an identifier for the shopping transaction that is pushed to the user based on a geographical location of the user. So, when the user is near a retailer that can assist with the shopping transaction (near defined as being within a predefined geo-fenced distance), a specific shopping transaction that the retailer is assigned to can permit the shopping collaboration agent to identify the shopping transaction and push it to the user.

At 230, the shopping collaboration agent requests feedback on one or more aspects of the shopping transaction. Feedback can be information being shared, such as images, video, text, graphics and the like. Feedback may also be a dynamic video phone call or dynamic video conference between a device of the shopping collaboration agent and a device of one of the second users.

At 240, the shopping collaboration agent receives the feedback on the one or more aspects from the remote collaboration manager and/or one or more second users assigned to the shopping transaction.

According to an embodiment, at 241, the shopping collaboration agent presents at least one of the one or more aspects to the user as a quote or a proposal for all or a portion of the shopping transaction. The quote or the proposal provided by a specific second user, which is an enterprise (such as a retailer).

In an embodiment, at 250, the shopping collaboration agent dynamically pushes a geographical location of the user to the remote shopping collaboration manager. The device of the shopping collaboration agent can provide a mechanism for obtaining the geographical location in an automated manner without user input or the user, via an interface on the device, can provide the geographical location for the shopping collaboration agent to communicate.

Figure 3:
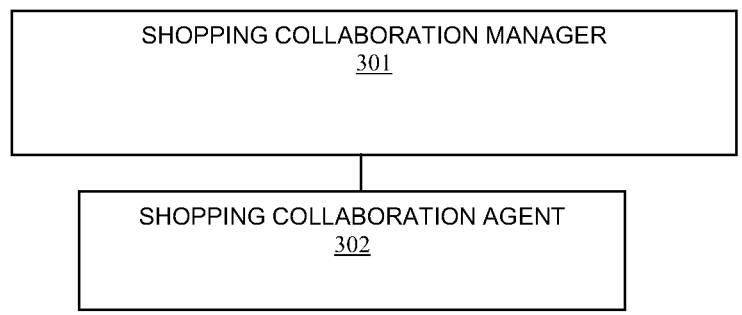
FIG. 3 is a diagram of a collaborative shopping system, according to an example embodiment.

FIG. 3 is a diagram of a collaborative shopping system 300, according to an example embodiment. The collaborative shopping system 300 includes one or more processors that are specifically configured to perform, inter alia, the processing associated with the methods 100 and 200 of the FIGS. 1 and 2, respectively. Furthermore, the collaborative shopping system 300 is operational over a network and the network can be wireless or a combination of wired and wireless. In an embodiment, the network is the Internet. In another case, the network is a cellular network. It yet another situation, the network is a satellite network. It may also be that the network uses all or a combination of: the Internet, cellular network, and/or satellite network.

The collaborative shopping system 300 includes a shopping collaboration manager server 301 and a shopping collaboration agent 302. Each of these and their interactions with one another will now be discussed in turn.

The shopping collaboration manager 301 processes on a physical machine or a Virtual Machine (VM) and is operational over a network. That is, the shopping collaboration manager 301 is implemented, resides, and programmed within a non-transitory processor-readable medium as executable instructions that a processor-enabled device executes. In some cases, the shopping collaboration manager 301 is accessible via one or more cloud processing environments. Example processing associated with the shopping collaboration manager 301 was presented above with reference to the FIG. 1.

The shopping collaboration manager 301 is configured to register the user with a shopping collaboration system and is configured to receive shopping preferences for a shopping transaction of the user. The shopping preferences and the shopping transaction defined above with reference to the discussions of the FIGS. 1-2.

The shopping collaboration manager server 301 also configured to assign one or more second users to the shopping transaction and record and further communicate information related to the shopping transaction between the user and the one or more second users.

The shopping collaboration agent 302 is implemented, programmed, and resides within a non-transitory processor-readable storage medium and executes on a mobile device of a consumer. Example processing associated with the shopping collaboration agent 302 was presented above in detail with respect to the method 200 of the FIG. 2.

The shopping collaboration agent 302 is configured to interact with the user, the shopping collaboration manager 301, and the one or more second users for purposes of communicating portions of the information and receive other portions of the information.

The information can be communication sessions, such as phone calls, video conferences, text messages, and the like. The information can also be images, graphics, text, documents, videos, and the like.

In an embodiment, the first machine having the shopping collaboration manager 301 is located in a cloud processing environment and the second machine that processes the shopping collaboration agent 302 is a mobile phone of the user. It is noted, that the user can use a variety of devices, such as a tablet and/or a laptop, each device having a shopping collaboration agent permitting the user to interact with the shopping collaboration manager 301.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method to enable collaboration between a user of a mobile device in a physical location store and one or more second users remote from the user, the method comprising:

registering, by the one or more processors, the user for collaborative shopping;

obtaining, by the one or more processors, shopping preferences from the user;

creating, by the one or more processors, a shopping transaction as directed by the user using the shopping preferences;

assigning, by the one or more processors, the one or more second users to the shopping transaction as permitted by the user, at least one of the second users is an individual known to the user, deriving one or more enterprises based on the shopping transaction, and permissions defined by the user in the shopping preferences, and assigning the one or more enterprise as one or more enterprise users to the transaction, creating, by the one or more processors, one or more communication sessions via the mobile device between the user and the second users during the shopping transaction for sharing information related to the shopping transaction, sending, by the one or more processors, an alert to a specific second user of the one or more second users based on a command or instruction of the user or based on one or more of the shopping preferences, receiving a piece of the information from the specific second user in response to sending the alert, and automatically sending a request for a quote to at least one of the one or more enterprises.

2. The method of claim 1, wherein sending an alert to a specific second user includes sensing an alert when an item is purchased.

3. The method of claim 1 further comprising receiving a user-initiated photo from the user, and displaying an image of physical item in the physical store and virtual alternatives to an item that is being considered for purchase.

4. The method of claim 1 further comprising, retaining a piece of information received from a specific second user and unsolicited by the user.

5. The method of claim 1 further comprising, dynamically altering or augmenting, by the one or more processors, the shopping preferences based on the information and/or actions taken by the user during the shopping transaction.

6. The method of claim 1 further comprising obtaining the physical location of the user using the mobile device, and, dynamically pushing, by the one or more processors, some or all of the information to the user based on the physical location of the user.

7. The method of claim 1 further comprising, dynamically sharing, by the one or more processors, some of the information with an enterprise system based on the shopping preferences, or the command or instruction of the user.

8. The method of claim 7 further comprising, dynamically pushing, by the one or more processors, offers from the enterprise system to the user based on the shopping preferences and/or the shopping transaction.

9. The method of claim 1, wherein registering further includes providing a collaborative shopping portal to the user and the second users for registration and for collaborating with one another.

10. The method of claim 1, wherein obtaining further includes defining the shopping preferences as: a shopping list, an event of the user for which a variety of goods and services are defined, a specific good, or a specific service.

11. The method of claim 10, wherein defining further includes including with the shopping preferences one or more of: a budget, a specific price, a geographic region for the shopping transaction, a specific brand, a specific enterprise, identifiers for the second users, a specific time frame for completing the shopping transaction, and/or a specific attribute for the goods, the services, the specific good, or the specific service.

12. The method of claim 1, wherein assigning further includes inviting the second users to collaborate on the shopping transaction based on the shopping preferences.

13. The method of claim 1, wherein creating further includes creating at least one communication session where the user initiates the at least one communication session and where the second users are on a variety of devices including: laptops, other mobile phones, and/or tablets.

14. A system for enabling collaboration between a user of a mobile machine in a physical store and one or more second users remote from the user, the system comprising:
- a first mobile machine having a shopping collaboration manager server implemented in a non-transitory computer-readable storage medium and which processes on the first machine; and
- a second machine having a shopping collaboration agent implemented in a non-transitory computer-readable storage medium and which processes on the second machine;
- the shopping collaboration manager configured to register the user with a shopping collaborate system and receiving shopping preferences for a shopping transaction of the user, and the shopping collaboration manager also configured to assign one or more second users to the shopping transaction and record and communicate information related to the shopping transaction between the user and the one or more second users, the shopping collaboration manager also configured to automatically assign one or more enterprise users that are affiliated with enterprises, the enterprises derived by the shopping collaboration manager based on the shopping transaction, the location of the user, and permissions defined by the user in the shopping preferences, and the enterprises are automatically added as some of the second users, the enterprises offer goods or services for the shopping transaction, the shopping collaboration agent configured to interact with the user, the shopping collaboration manager, the one or more enterprise users, and the one or more second users to send an alert to a specific second user of the one or more second users based on one or more of the shopping preferences, receive piece of the information from the specific second user in response to sending the alert, and automatically send a request for a quote to at least one of the one or more enterprises.

15. The system of claim 14, wherein the first machine is located in a cloud processing environment and the second machine is a mobile phone of the user.

* * * * *